UNITED STATES PATENT OFFICE.

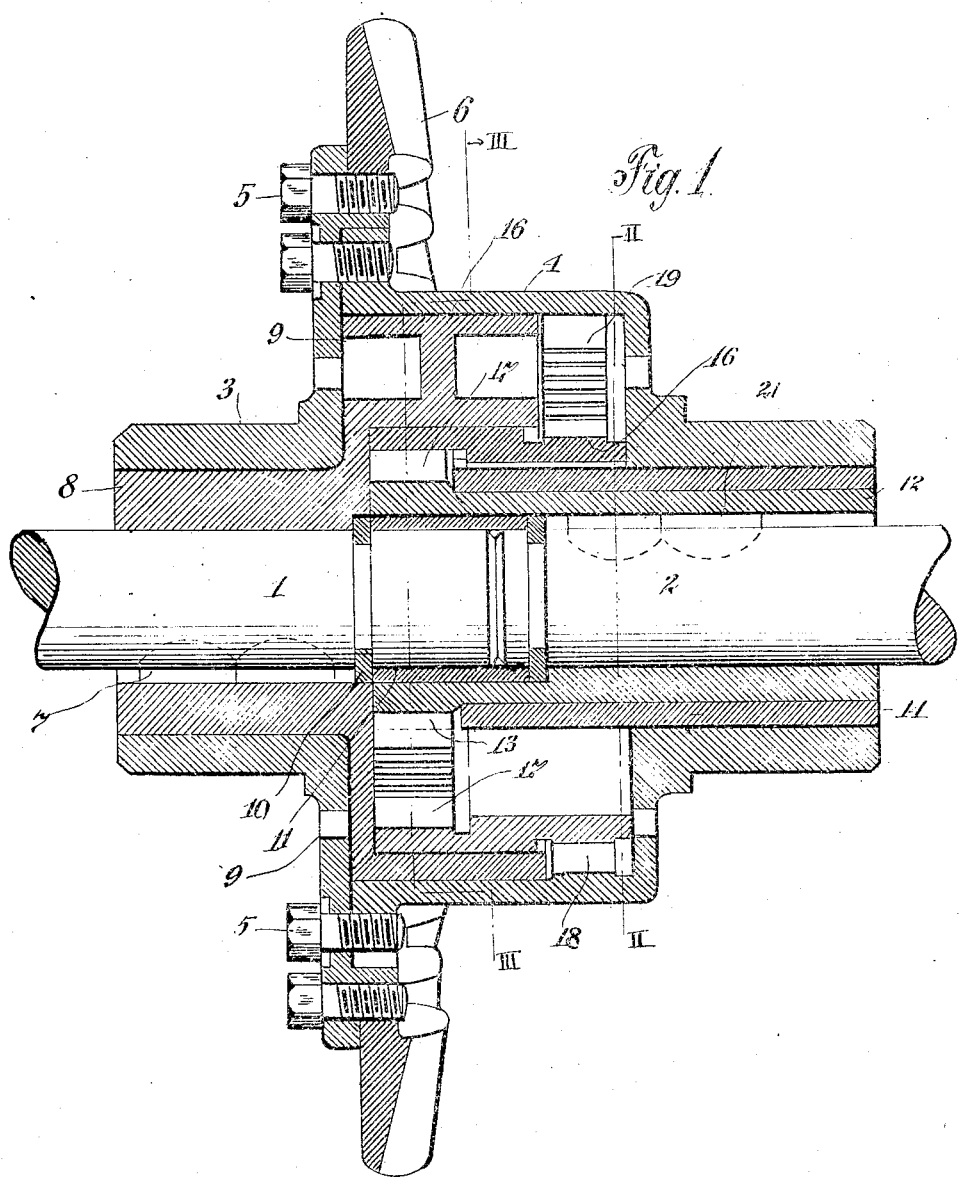

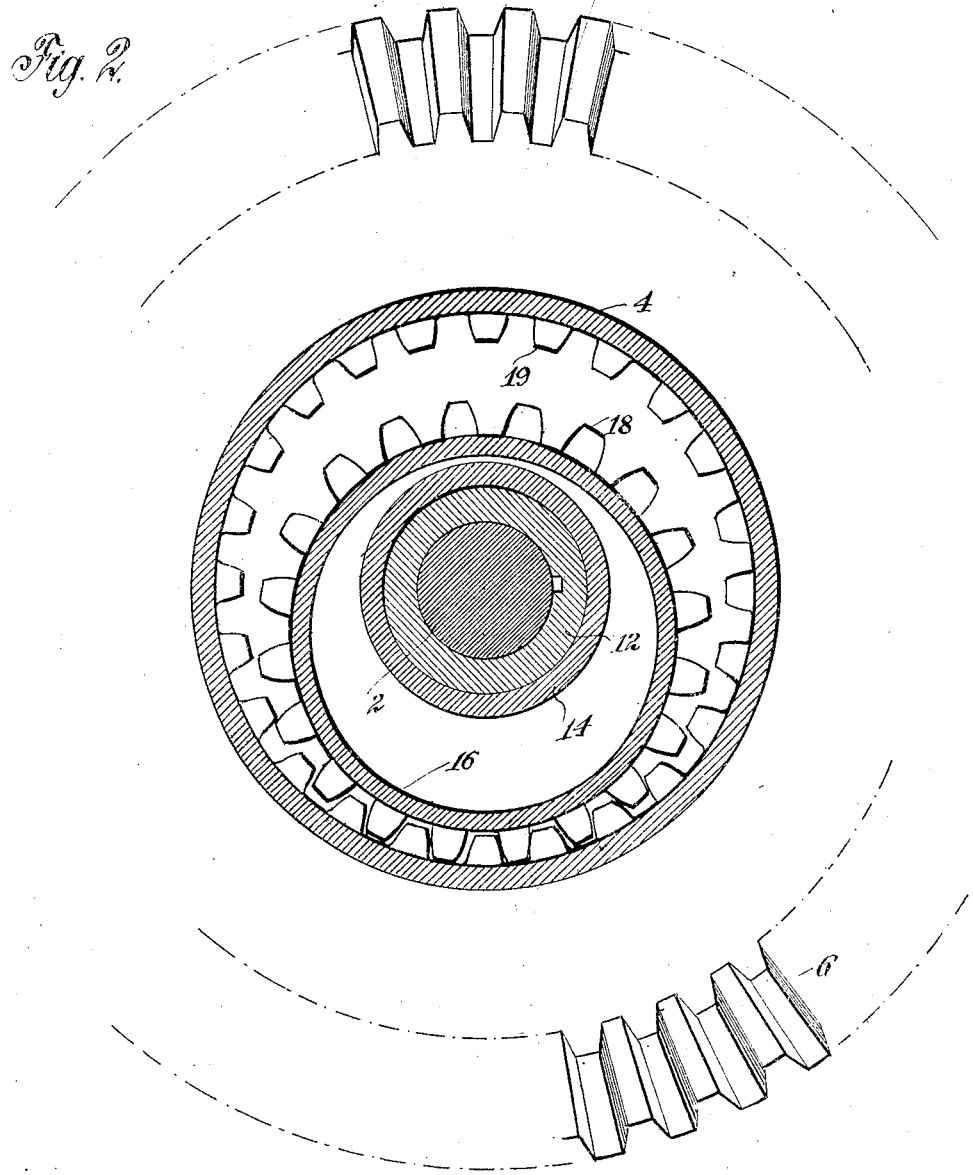

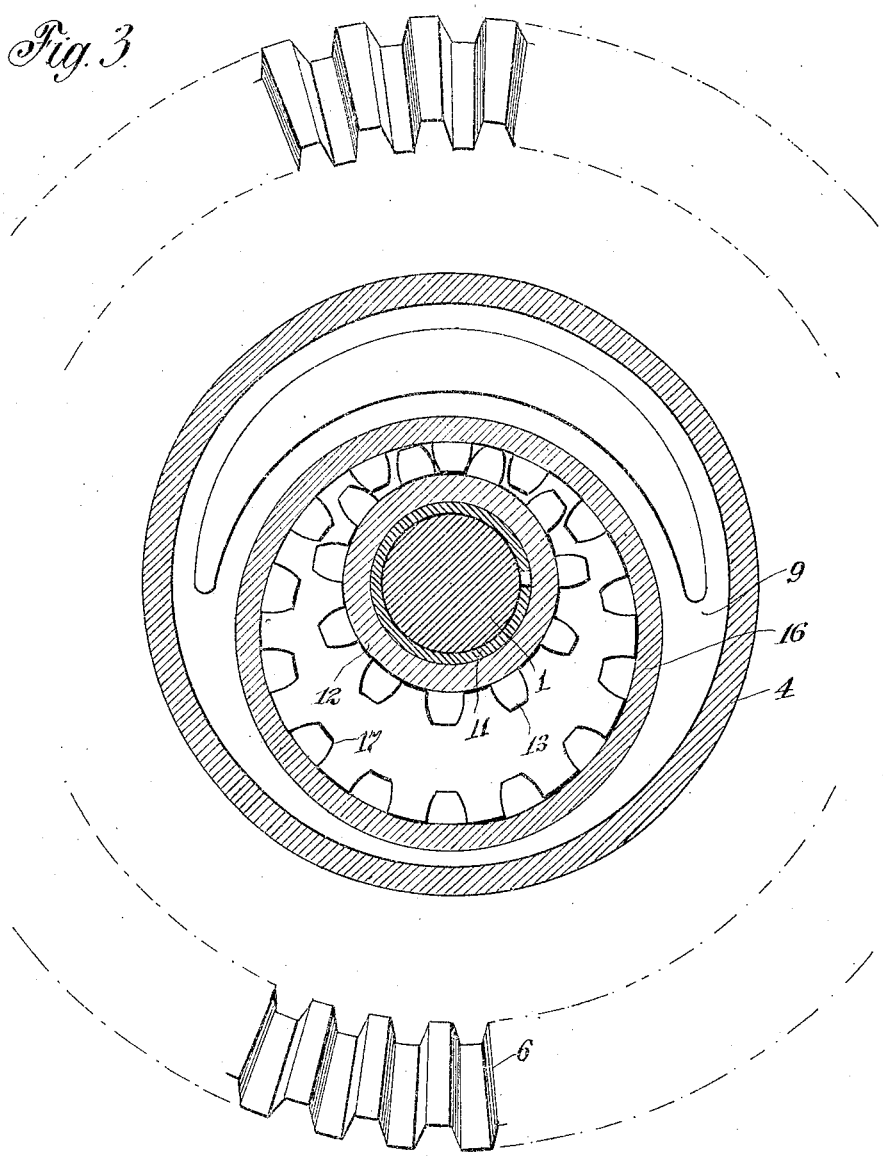

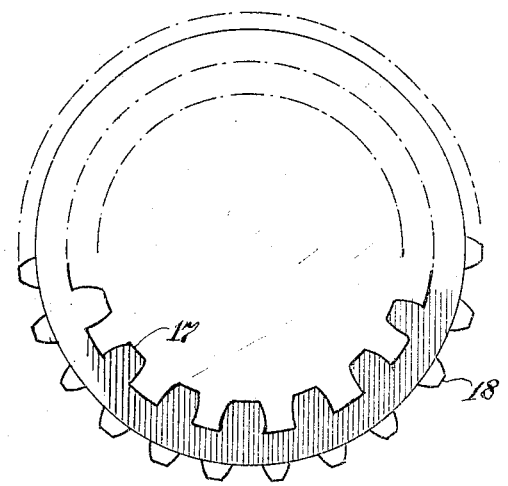
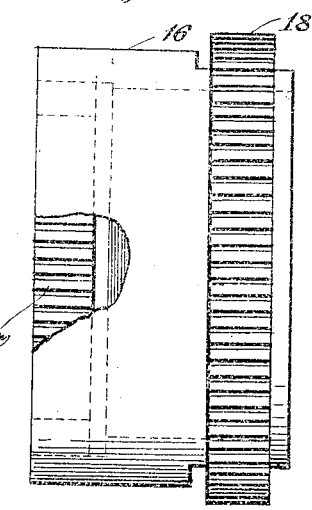
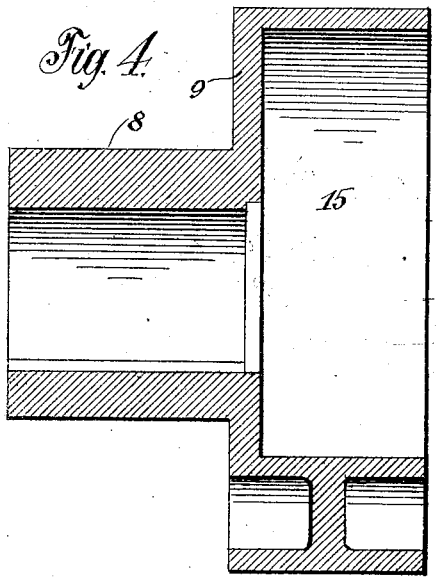
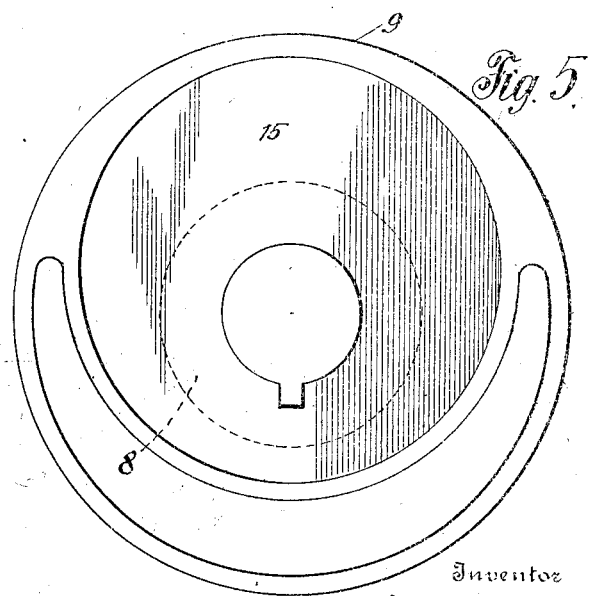

FRANK V. ELBERTZ, OF DETROIT, MICHIGAN, ASSIGNOR OF ONE-THIRD TO BYRON F. EVERITT AND ONE-THIRD TO E. R. EVANS, BOTH OF DETROIT, MICHIGAN.

DIFFERENTIAL MECHANISM.

1,282,783.     Specification of Letters Patent.     Patented Oct. 29, 1918.

Application filed March 16, 1917. Serial No. 155,147.

*To all whom it may concern:*

Be it known that I, FRANK V. ELBERTZ, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to a differential mechanism and more particularly to one adapted for use in automobiles or the like and to an arrangement thereof whereby peculiar advantages are obtained and whereby simplicity and rigidity of construction that minimize liability to accident, result from the arrangement of the parts.

The invention consists in the matters hereinafter set forth, and more particularly pointed out in the appended claims.

In the drawings,

Figure 1 is a view in longitudinal section of a differential mechanism that embodies features of the invention;

Fig. 2 is a view in transverse or cross section taken on or about the line II—II of Fig. 1;

Fig. 3 is a view in cross section taken on or about line III—III of Fig. 1;

Figs. 4 and 5 are views in detail of an eccentric bearing sleeve; and

Figs. 6 and 7 are views in detail of an intermediate driving pinion.

As herein shown in preferred form, the members 1 and 2 of a differential follower shaft are maintained in axial alinement in an outer drive casing 3, having a section 4 detachably secured as by cap screws 5 or the like to the casing and provided with a beveled driving gear 6. Obviously the latter may be of the ordinary spur type.

The casing section 4 acts as a journal for an eccentric bearing sleeve 9, the hub 8 of which is rotatable in the member 3 and the shaft section 1 is non-rotatably secured therein as by keys 7 or like suitable means, endwise movement of the shaft being prevented, if desired, by a suitable split washer 10 embracing a peripheral groove of the section and abutting a bushing 11 that in turn is contained in the elongated hub 12 of a pinion 13 which is keyed to the other shaft member 2, as indicated at 21, or otherwise non-rotatably connected therewith. A suitable bearing bushing 14 in the hub portion of the section 4 of the casing supports the hub 12 of the pinion.

A bearing recess 15 in the sleeve 9, eccentric to the axis of the portion 8 containing the member 1, provides support for a power transmitting member, shown in this instance in the form of an annulus or compound intermediate gear 16. Internal teeth 17 thereon mesh with the pinion 13 and external teeth 18 mesh with inner teeth 19 on the casing section 4.

Because of the eccentricity of the bearing recess 15, the points of engagement of the teeth 17 with the pinion 13 and of the teeth 18 with the teeth 19, are diametrically opposite. When power is imparted to the external gear 6 to turn the casing, the latter drives the intermediate double gear 16 in the same direction and thereby rotates the shaft section 2 through the pinion 13. As the latter is of less diameter than the teeth 18, the intermediate gear tends to revolve on the axis of the shaft 2, and thus forces the eccentric sleeve 9 to turn the same as if it were being driven by a crank and thereby rotates the shaft 1. This action occurs when there is any resistance in both shaft sections to the turning or driving torque.

If either section, for example, section 1, is free to turn, all the power is immediately transmitted to the other shaft section 2 barring that which is sufficient to rotate the free section at the same speed as the other.

The use of the eccentric as a driving member gives a uniform torque to the companion differential shaft member as if it were a direct gear connection, while at the same time the shaft meeting the least resistance can turn at greater speed than the driving member. As a result of this construction a very simple and effective mechanism with an extremely small number of parts, particularly gears, accomplishes the result which is novel in so far as it always causes the loaded member to be positively driven, in such a manner and by such means as to minimize the internal resistance of the mechanism. The work is essentially straight-lined and the necessity of a plurality of planet pinions, either bevel or spur is avoided.

Obviously, changes in the details of construction may be made without departing from the spirit of my invention and I do not care to limit myself to any particular form or arrangement of parts.

What I claim is:—

1. A differential mechanism comprising a pair of rotatable follower members, a driving member concentric therewith and an intermediate power transmitting member eccentric to the follower members adapted to rotate one of the follower members when it rotates, there being an eccentric connection between the intermediate member and other follower member for rotating the latter when the intermediate member revolves on the axis of the follower members.

2. A differential mechanism comprising a pair of rotatable follower members, a driving member in which the rotatable members are journaled concentrically and an intermediate power transmitting member eccentric to the follower members, in mesh with one of the follower members and with the driving member, the other follower member including an eccentric on which the intermediate member is rotatably secured and with which it revolves around the axis of the follower members, the points of engagement of the eccentric member with the driving member and the follower member to which it is geared being diametrically opposite.

3. A differential mechanism comprising a pair of rotatable follower members, a driving member concentric therewith in which the rotatable driven members are rotatably mounted and an intermediate power transmitting pinion eccentric to the driving member and in mesh with the driving member and one of the follower members, the other follower member including an eccentric bushing in which the power transmitting pinion is rotatably mounted eccentrically with the axis of the follower member, the eccentric bushing defining the orbit of revolution of the power transmitting pinion.

4. A differential mechanism including a casing, a pair of rotatable follower members concentrically mounted therein, an intermediate power transmitting member mounted eccentrically in the casing and adapted to rotate independently of its axis of eccentricity on its principal axis and positively connecting the casing with one of the follower members, and a sleeve journaled in the casing and positively connected to the other follower member providing an eccentric bearing for the intermediate member whereby the latter drives the connected follower member when it revolves on its eccentric axis.

5. A differential mechanism comprising a driving casing, a pair of alined follower shafts journaled concentrically therein, a sleeve journaled therein concentrically with one of the follower members and provided with an eccentric bearing recess, a pinion connected to one of the follower members directly, an inner gear on the casing, and an intermediate transmitting pinion in gear both with the casing gear and with the shaft pinion, journaled in the eccentric recess of the sleeve.

6. A differential mechanism comprising a pair of alined follower shafts, a driving casing concentrically mounted on the follower shafts, a sleeve secured to one of the follower shafts and journaled in the casing and provided with an eccentric bearing recess, an inner annular gear on the casing, a pinion secured to the other follower shaft, and a transmitting intermediate pinion journaled in the eccentric recess of the sleeve in gear with the inner gear of the casing and with the pinion of the other follower shaft.

7. A differential mechanism comprising a pair of follower shafts, a casing rotatably mounted on the follower shafts, a pinion secured to one of the follower shafts, a sleeve secured to the other follower shaft and journaled concentrically in the casing, that is provided with a bearing recess eccentric to the follower shaft to which it is secured, an inner annular gear secured to the casing concentric with the follower shaft, and a double intermediate pinion journaled in the eccentric bearing recess of the sleeve in mesh with the casing gear and with the shaft pinion.

8. A differential mechanism comprising a pair of axially alined follower shafts, a pinion having an elongated hub secured to one of the shafts and extended over the other shaft end portion, a sleeve secured to the other follower shaft having a bearing recess extending over the pinion eccentrically thereto, a casing journaled on the sleeve and on the hub of the pinion, an intermediate pinion journaled in the eccentric recess of the sleeve in mesh with the shaft pinion, and provided with outer gear teeth that mesh with the internal gear teeth of the casing.

9. Differential mechanism comprising a pair of rotatable follower members, a driving member concentric therewith and an intermediate transmitting member confined to travel eccentrically to the follower members and connected to one of the latter to drive it when the transmitting member rotates and to the other to drive it when it revolves in the eccentric path.

10. Differential mechanism comprising a rotatable driving member, a pair of follower members concentric with the driving member, an intermediate transmission member in positive connection with one of the follower members and with the driving member to operate the former when the intermediate member rotates on its own axis, and means in positive engagement with the other follower member adapted to cause the intermediate member to travel eccentrically to the follower members' axes and adapted to interlock with the main driving member and transmitting member to rotate on its own axis, and thereby drive said other follower member.

11. A differential mechanism comprising a pair of follower members, a driving member concentric therewith and an intermediate power-transmitting member eccentrically connected to one follower member to drive the latter and rotatably engaged by the other follower member and the driving member.

12. In differential mechanism, a driving member including an inner annular gear, a pair of follower members, a pinion secured to turn positively with one of the follower members, a compound gear adapted to mesh simultaneously with the inner annular gear of the driving member and the follower member pinion, and means for causing the compound gear to revolve eccentrically as well as rotate on its own axis.

13. A differential mechanism comprising a driving member, a pair of follower shafts journaled concentrically therewith, an internal annular gear secured to the driving member concentric with the shafts, a pinion secured non-rotatably to one follower shaft, an intermediate compound gear eccentric to and in mesh with both the shaft pinion and the annular gear and means on which the compound gear is rotatable, adapted to maintain the compound gear in mesh with the annular gear and shaft pinion and to drive the other follower shaft when the intermediate gear revolves eccentrically to the shaft axis.

14. A differential mechanism comprising a driving member having an internal gear, a pair of follower shafts concentric thereto, a pinion secured on one follower shaft, a compound gear having external teeth in mesh with the internal gear and having internal teeth in mesh with the pinion, and a member on which the compound gear is journaled that is non-rotatably secured to the other follower shaft.

15. In differential mechanism, the combination with a driving member and a pair of follower members concentric thereto, of driving connections between the driving member and follower members including an external gear turned by the driving member and an internal gear in fixed relation to the external gear and by which one of the follower members is rotated.

16. In a differential mechanism, an internal gear, a bearing member and a pinion both in axial coincidence with the gear, an external gear journaled eccentrically on the bearing member in mesh with the internal gear and an internal gear secured concentrically to the external gear in mesh with the pinion.

17. In a differential mechanism, a rotatable driving member, a pair of rotatable follower members concentric therewith, and a power transmitting member externally geared to the driving member and internally geared to one follower member and eccentrically connected to the other follower member to rotate the latter.

18. In a differential mechanism having a rotatable driving member and a pair of rotatable follower members, power transmitting means consisting of an annulus externally geared to the driving member and internally geared to one follower member and an eccentric connection non-rotatably secured to the other follower member to which the annulus is rotatably secured.

In testimony whereof I affix my signature in the presence of two witnesses.

FRANK V. ELBERTZ.

Witnesses:
ANNA M. DORR,
KARL H. BUTLER.